(12) United States Patent
Hutchison et al.

(10) Patent No.: US 11,093,627 B2
(45) Date of Patent: Aug. 17, 2021

(54) KEY PROVISIONING

(71) Applicant: L3 Technologies, Inc., New York, NY (US)

(72) Inventors: Jerry Hutchison, Huntingdon Valley, PA (US); Todd Ditzman, Vincentown, NJ (US)

(73) Assignee: L3 Technologies, Inc., New York, NY (US)

( * ) Notice: Subject to any disclaimer, the term of this patent is extended or adjusted under 35 U.S.C. 154(b) by 180 days.

(21) Appl. No.: 16/177,303

(22) Filed: Oct. 31, 2018

(65) Prior Publication Data

US 2020/0134212 A1 Apr. 30, 2020

(51) Int. Cl.
| | |
|---|---|
| *G06F 21/62* | (2013.01) |
| *G06F 9/30* | (2018.01) |
| *H04L 9/08* | (2006.01) |
| *H04L 9/06* | (2006.01) |

(52) U.S. Cl.
CPC ...... *G06F 21/6209* (2013.01); *G06F 9/30007* (2013.01); *H04L 9/0643* (2013.01); *H04L 9/085* (2013.01)

(58) Field of Classification Search
CPC . G06F 21/6209; G06F 9/30007; H04L 9/085; H04L 9/0643; H04L 9/0662; H04L 9/0833
See application file for complete search history.

(56) References Cited

U.S. PATENT DOCUMENTS

| | | | |
|---|---|---|---|
| 6,061,791 A | 5/2000 | Moreau | |
| 6,185,685 B1 | 2/2001 | Morgan et al. | |
| 6,307,936 B1 | 10/2001 | Ober et al. | |
| 6,374,355 B1 | 4/2002 | Patel | |
| 6,662,299 B1 | 12/2003 | Price, III | |
| 6,684,330 B1 | 1/2004 | Wack et al. | |
| 6,885,747 B1 | 4/2005 | Scheidt et al. | |
| 7,212,632 B2 | 5/2007 | Scheidt et al. | |
| 7,596,697 B2 | 9/2009 | Sandhu et al. | |
| 7,974,410 B2 | 7/2011 | Scheidt et al. | |
| 8,712,046 B2 | 4/2014 | Scheidt et al. | |
| 9,191,200 B1 * | 11/2015 | Adams | H04L 9/0897 |
| 9,954,680 B1 * | 4/2018 | Machani | H04L 9/085 |
| 2002/0152392 A1 * | 10/2002 | Hardy | H04L 9/0877 |
| | | | 713/189 |
| 2003/0145203 A1 * | 7/2003 | Audebert | G06Q 20/341 |
| | | | 713/169 |
| 2004/0054891 A1 * | 3/2004 | Hengeveld | H04L 9/0866 |
| | | | 713/163 |
| 2006/0059573 A1 * | 3/2006 | Jung | H04L 63/10 |
| | | | 726/31 |

(Continued)

*Primary Examiner* — Darren B Schwartz
(74) *Attorney, Agent, or Firm* — Condo Roccia Koptiw LLP

(57) ABSTRACT

A device receives a first data item. The device stores the first data item in non-volatile memory. The device subsequently receives a second data item, where the second data item was previously generated from the first data item and a cryptographic key. The device performs a function such as, for example, an exclusive-or operation on the first data item and the second data item to generate the cryptographic key. The device uses the generated cryptographic key to encrypt data which may be transmitted over a wireless interface.

19 Claims, 6 Drawing Sheets

(56) References Cited

U.S. PATENT DOCUMENTS

| | | | |
|---|---|---|---|
| 2008/0008322 A1* | 1/2008 | Fontana | H04L 9/0869 380/277 |
| 2008/0232585 A1 | 9/2008 | Zahari | |
| 2008/0247539 A1* | 10/2008 | Huang | H04L 9/0833 380/28 |
| 2008/0307110 A1* | 12/2008 | Wainner | H04L 63/104 709/238 |
| 2011/0305333 A1* | 12/2011 | Jacobson | H04L 9/0833 380/44 |
| 2012/0101623 A1* | 4/2012 | Hwang | G06F 21/10 700/117 |
| 2012/0201379 A1* | 8/2012 | Fuchs | H04L 9/0897 380/255 |
| 2012/0243687 A1* | 9/2012 | Li | H04L 9/085 380/277 |
| 2012/0321076 A1* | 12/2012 | Shah | H04L 9/0869 380/44 |
| 2014/0192976 A1* | 7/2014 | Yoon | H04L 9/0861 380/44 |
| 2015/0127946 A1* | 5/2015 | Miller | G06F 21/6218 713/171 |
| 2016/0013939 A1* | 1/2016 | Jun | H04L 9/003 380/44 |
| 2016/0132699 A1* | 5/2016 | Miller | G06F 21/80 713/193 |
| 2016/0283937 A1* | 9/2016 | Reese | G06F 21/602 |
| 2018/0165479 A1* | 6/2018 | Chen | G06F 12/1408 |
| 2018/0176222 A1* | 6/2018 | Bhaskar | H04L 63/0815 |
| 2019/0250672 A1* | 8/2019 | Bhattacharyya | H04L 67/125 |

\* cited by examiner

KEY PROVISIONING

BACKGROUND

Encryption is frequently used to secure communications between electronic devices. For example, encryption may be employed to protect against illicit access to data communicated between devices (confidentiality) and to prevent illegitimate devices from spoofing authentic devices.

Encryption employs cryptographic keys to perform encryption processing. A cryptographic key, or key, may be a data item that serves as an input to a cryptographic algorithm. For example, a cryptographic algorithm for transforming plaintext into ciphertext may take plaintext and a cryptographic key as inputs. The key determines, in part, the output of the algorithm.

SUMMARY

Applicant has developed systems and methods for provisioning cryptographic keys onto devices.

An example process of provisioning a cryptographic key onto a device may comprise receiving by the device a first data item, which may be known by an authorized administrator system. The first data item may have been generated in any suitable manner. For example, the first data item may have been generated using a random number generator. In another example, the first data item may have been generated by performing a function such as, for example, a cryptographic hash function, on a concatenation of an administration key, which may be referred to as an admin key, and an identifier. The identifier may be any information or data that is suitable for the particular application such as, for example, an identifier associated with the device, or an identifier associated with a group of devices of which the device is one. The admin key may be any that is suitable and may be, for example, associated with the device or with a group of devices.

The first data item may be received into the device at any time prior to its deployment for use. For example, the first data item may be received into the device at or near the time of the manufacture of the device. In another example, the first data item may be received into the device just prior to its deployment at an operational location. The device may store the first data item in nonvolatile computing memory.

The device may subsequently receive a second data item, where the second data item was previously generated from the first data item and a cryptographic key. In an example scenario, the second data item may have been generated by performing an exclusive-or operation (XOR) on the first data item and the cryptographic key.

The device may use the received first data item and the received second data item to generate the cryptographic key. In an example embodiment wherein the received second data item was previously generated by performing an exclusive-or operation on the cryptographic key and the first data item, the device may generate the cryptographic key by performing an exclusive-or operation on the first data item and the second data item. The device may store the generated cryptographic key in volatile memory.

The device may thereafter use the generated cryptographic key to perform cryptographic processing. For example, the device may encrypt data using the cryptographic key and communicate the encrypted data over a communication interface. The device may also decrypt data that was encrypted using the cryptographic key.

One or more corresponding systems may be used to interface with the device in order to load the first data item and the second data item onto the device. For example, a first system, which may be a secure system may be used to generate and load the first data item onto the device. The first system may generate the first item, which may be known only to an authorized administrator and/or system, in any suitable manner. For example, the first system may generate the first data item from a random number generator. In another example, the first system may generate the first data item from the admin key by performing a function such as, for example, a cryptographic hash function, on a concatenation of the admin key and an identifier associated with the device. The first system may load the first data item onto the device at any suitable time such as, for example, during manufacture of the device.

A second system may be employed to generate and load the second data item onto the device. The second system may be used, for example, during deployment of the device to make the device operable to encrypt and/or decrypt data and/or to otherwise perform secure communications. The second system may perform processing to identify the first data item that has been provisioned onto the device. For example, the second system may identify an identifier associated with the device and may use the identifier to retrieve the first data item from a database containing identifiers corresponding to devices. In another example, the second system may generate the first data item by performing a cryptographic function in a similar manner as was previously performed to generate the first data item on a concatenation of the admin key and the device identifier.

The second system may determine the cryptographic key. For example, the cryptographic key may be retrieved from computing memory. The cryptographic key may be any suitable key including, for example, one designated specifically for use by the device, or one designated for use by a designated plurality or group of devices.

The second system may generate the second data item from the first data item and the cryptographic key. For example, the second system may perform an exclusive-or operation on the first data item and the cryptographic key to generate the second data item. The second system may then transmit the second data item to the device. The second data item may be transmitted, for example, over a wireless interface.

The second system may thereafter receive encrypted data from the device. The encrypted data may be encrypted using the cryptographic key. The second system may use the cryptographic key to decrypt the received information. The second system may continue communicating with the device using the cryptographic key.

This Summary is provided to introduce a selection of concepts in a simplified form that are further described herein in the Detailed Description. This Summary is not intended to identify key features or essential features of the claimed subject matter, nor is it intended to be used to limit the scope of the claimed subject matter. Other features are described herein.

BRIEF DESCRIPTION OF THE DRAWINGS

The foregoing summary and the following additional description of the illustrative embodiments may be better understood when read in conjunction with the accompanying exemplary drawings. It is understood that the potential embodiments of the disclosed systems and methods are not

DETAILED DESCRIPTION

Figure 1:
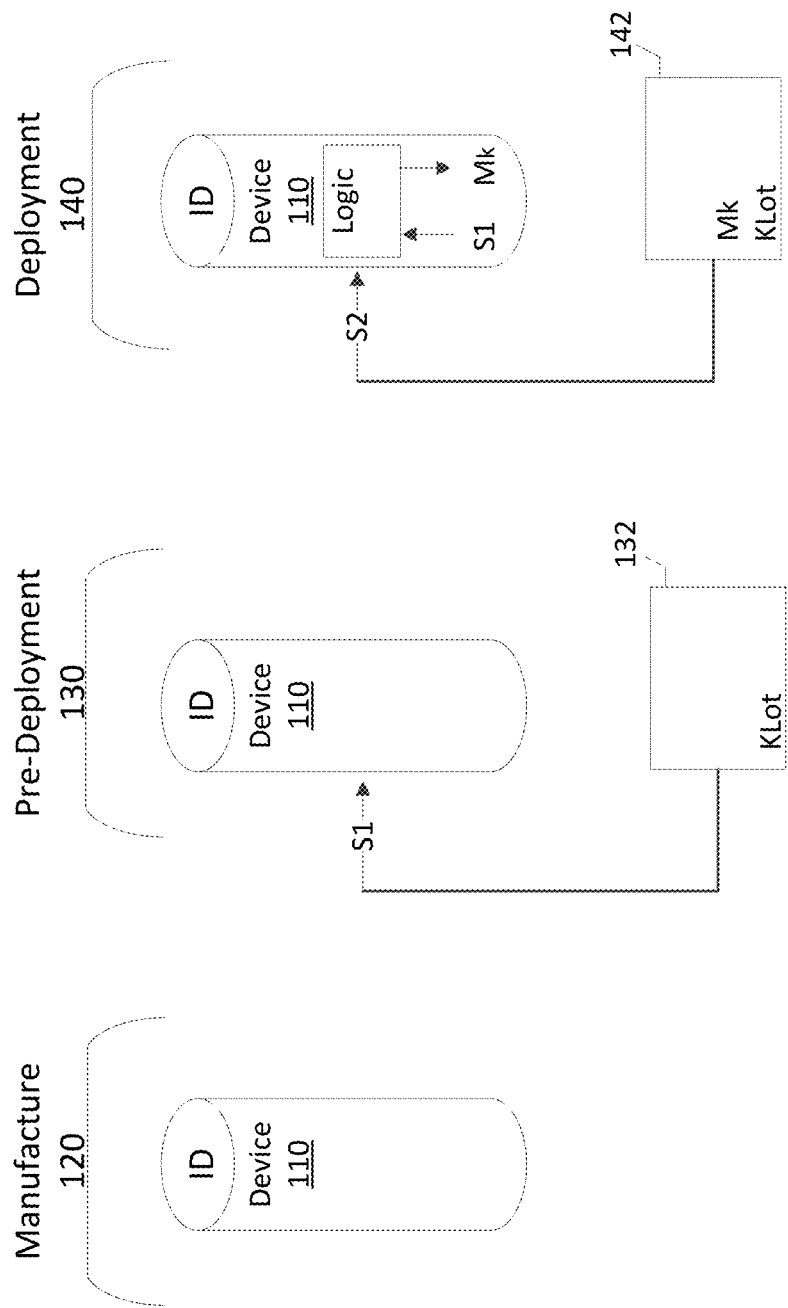
FIG. 1 is a diagram depicting example stages of provisioning for an example device.

The number and types of deployed electronic computing devices continues to increase. Indeed, the Internet of Things (IoT) promises a network of physical devices of various types that are embedded with electronics and software to enable the devices to exchange data. For many such devices, there is a benefit to using cryptographic encryption to secure the operations and communications. This is especially true, for example, in the context of devices used for tactical or military operations in which devices are often required to be secured so as to provide confidentiality, integrity, and availability.

As another example, a large number of buoys (e.g., sonobuoys) are deployed throughout the ocean. These buoys can communicate collected data to an authorized system to serve the mission purposes and/or to other devices. However, due to the size of the area the buoys cover, their diverse deployment scenarios, and their long storage time prior to deployment (e.g., often several years) encrypting the buoys' communication and/or protecting the keys used for such cryptographic communications has proven to be difficult and cost prohibitive. However, use of the key provisioning techniques described herein may make such cryptographic applications less expensive and more feasible for widespread deployment. For example, using the key provisioning techniques described herein may allow the cryptographic keys to be determined at the buoys at the time of deployment without explicitly loading the actual keys onto the buoy.

Securing devices using cryptography frequently involves making cryptographic keys available to the devices. But provisioning cryptographic keys onto devices is sometimes made difficult by the limitations associated with many devices. For example, devices are often: physically small; low power; low cost; disposable; stored for long periods of time prior to use; and deployed in large numbers over geographically disperse areas. These and other characteristics add to the complexities of provisioning keys onto the devices. Further, once a key has been provisioned to the device, the key must be safeguarded at the device to prevent the key from becoming known outside the device (e.g., stolen from the device).

The operating environment sometimes adds complexity to key provisioning. Devices used in tactical military deployments are illustrative of the demanding operating conditions for some devices. Tactical devices such as, for example, sonobuoys, forward base perimeter sensors, hand launch unmanned aerial vehicles (UAVs), and smart munitions may be used once and then discarded. Such devices are often at high risk of being compromised. An adversary may recover devices in significant numbers making secure key management and tamper protection by conventional means a challenge.

Legacy approaches to key provisioning and management are labor-intensive and do not scale to a large number of managed objects. One existing method of key management and provisioning which may be referred to as "key fill" involves physically accessing each device that is intended to be secured and loading one or more keys onto the device. The loaded keys may be said to be in a "red" state, and ready to use. The keys may also be loaded in a "black" state, meaning the keys have been encrypted with another key. In some instances, the key that is used for performing encryption/decryption during operation of the device, which may be referred to as the Mission Key (MK), may be loaded onto the device, while in other instances, a seed key or Key Encryption Key (KEK) may be loaded to enable use of future black key loads.

Key fill processing imposes several additional requirements on devices. For example, key fill processing often requires a device to have a "fill port" with which keys are loaded onto the device. Such a port is typically otherwise unnecessary and adds cost to the device. Key fill processing typically requires that each device be individually handled for key management. Such a requirement may be a significant limitation for systems that involve a large number of devices. Key fill processing typically requires that keys be stored in volatile memory to support tamper protection which imposes an additional power requirement on a device and limits the storage time. Additionally, for military applications, military security doctrine often requires that keyed devices become classified at the level of the key stored thereon, which limits handling of the device to specially cleared personnel. These requirements add cost and complexity to deploying devices, which are often intended to be inexpensive and disposable.

Another processing method employed in provisioning cryptographic keys involves "splitting" keys. After a key has been loaded onto a device, the key is "split," with one part of the key remaining stored securely inside the device, and another part of the key being transferred to a token or storage device that is removed from the device. A key is not recoverable without both splits. The token is maintained by a custodian and separated from the device. In the context of a military environment, the tactical device becomes unclassified if all of the key is unrecoverable based on removal of the key split token. The key may be reconstructed by bringing the token and tactical device together so that the two key split parts may be used to reconstruct the key for use in performing the desired cryptographic operation. Delivery of the split to the tactical may be a physical operation or over the air.

Traditional key splitting techniques are manually intensive and require significant logistical planning. For example, traditional key splitting techniques require that the final mission key or key encryption key be present in the device (protected by the split) prior to deployment. A person or persons responsible for operation of a device, who may be referred to as a mission manager, must arrange prior to the mission to get matching key material to the tactical device and to the asset that will operate the communications link to the tactical device. The mission manager delivers the key to the tactical device at the fill port, and then generates a key split. Token creation requires yet another interface that adds to the cost of the device. The mission manager must maintain the token until time for the mission to be executed. When the time for the mission comes, the mission manager must then return with the token to the device and insert the token into the device so as to generate a mission key. The mission manger must also deliver the matching mission key to the asset that will operate a secure link to the tactical device. The manual nature and complex logistics make split key management and coordination expensive and error prone. It becomes impractical when a hundred or more tactical devices may be deployed for a single mission, as in the case, for example, with a typical deployment of tactical devices such as sonobuoys.

Over the air (OTA) key loading is a processing technique intended to address some of the limitations associated with manual delivery of keys to devices. OTA key loading may comprise encrypting keys to form "black key packages" which may be delivered to the tactical device at the time deployment. The OTA key loading processing may use asymmetric key operations similar to Public Key Infrastructure (PKI) to create shared secrets used to transfer black keys over an insecure channel. PKI is typically strengthened for key management applications as exemplified in Tactical Device Key Management Architecture (TDKM). For example, ephemeral private keys may be created for one time use with each key transfer resulting in significant computation requirements on the tactical device.

While OTA processing addresses some limitations associated with manual provisioning of keys, it too has drawbacks. OTA key loading techniques may be computationally intensive, which may be especially troublesome for a typical device with limited computing and power resources. TDKM requires a long-term private key that is tamper protected. It is common practice to store tactical devices up to five years in an unpowered state prior to deployment. But for many tactical military applications, private key material has a lifetime of less than five years. Application of the TDKM method for some large device deployments is expensive, and in some instances, unworkable.

Applicant discloses improved systems and methods for cryptographic key provisioning and management. In an example, a device may be loaded with a first data item that was generated from an admin key. The device may store the first data item in non-volatile memory. The device may subsequently receive a second data item, where the second data item was previously generated from the first data item and a cryptographic key. The second data item may have been generated, for example, using a splitting operation such as, for example, an exclusive-or operation, on a cryptographic key using the first data item. The device may then perform a function such as, for example, a combining operation, which may be, for example, an exclusive-or operation, on the first data item and the second data item to generate the cryptographic key. The device may thereafter use the generated cryptographic key to encrypt data which may be transmitted over a wireless interface. The disclosed systems and methods provide lightweight and low-cost key management which may be suitable for many device deployments including, for example, one-time use devices with short-lived missions that may be provisioned with a single key and in an environment where keys have a defined period of use.

FIG. 1 depicts operations performed on a device 110 at various stages of deployment. As shown, at an initial stage 120, the device 110 is created or manufactured. In an example, the device 110 may be a tactical military device which may be manufactured along with a plurality of similar devices. By way of further example, the device 110 may be a sonobuoy that is one of a group or lot of sonobuoys. As illustrated, the device 110 may be assigned a device identifier (ID) at or near the time of manufacture. The device ID may be any suitable identifier such as, for example, a universal ID or serial number. In the instance the device is a tactical device, the device ID may be an Electronic Serial Number (ESN) that may be stored in non-volatile memory or in a fuse-based register. The device ID may be placed on an exterior label on device 110. The device ID is typically not sensitive information but may be difficult to change. In a scenario where the device 110 is just one of a group or lot of devices being manufactured, each of the devices may be assigned a device ID.

At stage 130, prior to operational deployment, the device 110 may receive a first data item S1 from a provisioning system 132. The first data item S1, which may also be referred to as a first split, may have been generated and stored on the device 110. In an example, the first data item S1 may be generated using a random number generator algorithm and provisioned by the provisioning system 132 onto device 110. In another example, the system 132 may use the device ID associated with the device 110 and an administrative or admin key to generate the first data item. In an example scenario, the admin key may be a group key, KLot, that may be associated with, for example, the device 110 or a group of devices. KLot may be, for example, a master key used for each device in a manufacturing lot or otherwise chosen group of devices. The number of devices associated with one key may vary. KLot is stored in strongly protected storage in a device 132 which performs operations using KLot without revealing KLot. The device 132 may comprise active tamper protection and use of the device 132 may be limited to well protected areas. The device 132 may generate the first data item S1 by performing a function on a concatenation of KLot with the device ID for the device 110. In an example scenario, the first data item S1 may be generated by performing a secure hash algorithm function on the concatenation of KLot with the device ID. The processing may be expressed as S1=SHA (KLot||ID), where || refers to the concatenation function, and SHA refers to a secure hash algorithm which may be any irreversible function evaluated for security purposes. It will be appreciated that while a secure hash function is described in connection with the processing herein, other suitable algorithms may be used to generate S1. Further, in the instance a secure hash function is employed, any suitable algorithm may be used including, for example, a Generalized Concatenated Key Derivation Function (GCKDF). Once the first data item S1 is received by device 110, it is stored in non-volatile memory.

It will be appreciated that a plurality of devices may have a first data item S1 loaded at stage 130. For example, a plurality of tactical devices such as, for example, a plurality of sonobuoys may have a first data item S1 stored thereon. In one scenario, the first data item S1 loaded on each of the devices in the plurality may be different from the others and may be based in part on the device ID associated with each particular device. In another scenario, the same first data item S1 may be loaded onto the plurality of devices, having been generated based upon a group ID associated with the plurality of devices, rather than individual device ID's for each device.

Because the first data item S1 is generated using both the group key KLot and the device ID, it is difficult for an adversary, who may obtain access to only the device ID, to replicate the first data item S1. It will also be appreciated that although S1 was generated using KLot, KLot cannot be derived from information stored in the device 110. The device 110, with the first data item S1 stored thereon, may be stored and handled as an unkeyed but controlled item.

While stage 130 is depicted as separate from and between manufacture stage 120 and deployment stage 140, it will be appreciated that stage 130 and the activities depicted may take place at any point in time beginning with manufacture of the device, up until the time of operational deployment. Accordingly, the loading of the first data item S1 may be performed as part of, or in connection with, the manufacture of the device 110. Likewise, the loading of the first data item S1 may be performed in connection with deployment, just prior to the generation and loading of the second data item S2 as described below.

Referring to FIG. 1, at stage 140, the device 110 is prepared for operational deployment. When it is time to configure the device 110 for operational deployment, which for a tactical device may be a mission deployment, a computing system 142, which may be referred to as a mission split generator, may use the device ID for device 110 to identify the corresponding admin key, KLot, and thereby determine the first data item S1. In one example scenario, the mission split generator 142 may generate the first data item S1 in the same manner as described above using KLot and the device ID and as represented by the expression S1=SHA (KLot∥ID). It will be appreciated that the function or algorithm used by computing system 142 will be consistent with that used in the initial generation of S1 for loading onto the device. In another example scenario, the mission split generator 142 may use the device ID of device 110 to query a database for the first data item S1 associated with the device 110.

The mission split generator 142 uses a cryptographic key, which may be referred to as a mission key Km, and the first data item S1 to generate a second data item S2, which also may be referred to as a split. Generating splits is a technique used to share a secret data item that is intended to be maintained in secret by generating two or more individual components, i.e., splits, from which the secret data item may be generated. The splits may have the characteristic that if a person has only one split, it is not possible to generate the secret data item. A person in possession of all of the generated splits, or a designated subset of the entirety of splits, may be able to generate the secret data item. Splits may be used to protect, for example, key material such as the mission key Km. In an example, the mission split generator 142 may perform a splitting operation on the mission key Km using the first data item S1 in order to generate the second data item S2, which may be referred to as a split. The splitting operation may be any that generates a suitable data item. In an example, the splitting operation comprises performing an exclusive-or operation on the first data item S1 and the mission key Km to generate S2. The generation of the second data item S2, i.e., the split, may be represented by the expression S2=[SHA (KLot∥ID)]⊗ Km, where ⊗ refers to the binary exclusive-or operation. The mission key Km may have been derived in any suitable manner. For example, the mission key Km may have been distributed to the mission split generator 142 from a key management infrastructure, or Km may have been made locally using a suitable random number generator. The mission key Km may be stored in strongly protected storage in a strongly protected location that is unlikely to be compromised.

The mission key generator 142 communicates the generated second data item S2 to the device 110. The mission key generator 142 may communicate the S2 over any suitable interface, including any suitable wireless interfaces.

The device 110 uses the received second data item S2 and the previously received first data item S1 to generate the cryptographic key, mission key Km. In an example wherein the second data item S2 was generated by mission generator 142 using a splitting operation, the device 110 may generate Km by performing a combining operation on the first data item S1 and S2. The combining operation combines S1 and S2 to form a new value. In an example scenario, the combining operation may be the same operation as the splitting operation that was used to generate the split S2. In an example scenario wherein the second data item S2 was generated by the mission key generator 142 using an exclusive-or operation, i.e., a splitting operation, on the first data item S1 and the cryptographic key Km, device 110 generates Km by performing an exclusive-or operation, i.e., a combining operation, on the first data item S1 and the second data item S2. The device 110 stores the generated mission key Km in volatile memory. The device 110 may thereafter use the mission key Km to encrypt data and to communicate the encrypted data to the asset that is being used to operate the mission and/or device. Likewise, the device 110 may be adapted to receive data that was encrypted using the mission key Km and to decrypt the encrypted data. In an implementation where Km may be at risk to be identified by an adversary, the mission key Km may have a limited trusted life.

While stage 140 depicts a single device 110, it will be appreciated that a plurality of devices may receive a second data item S2 and generate a mission key Mk. For example, a plurality of tactical devices such as, for example, a plurality of sonobuoys may have a second data item S2 loaded thereon, and thereafter, generate a mission key. In an example scenario, a plurality of sonobuoys may be launched from an airplane into a body of water, after which communications may be established with the devices and a second data item S2 downloaded to the devices. The mission split generator 142 may determine the device ID's of all of the devices in the group using any suitable means including, for example, by scanning external identifiers on each of the devices, or by communicating with the devices over a wireless interface to request and receive the device IDs. It will be appreciated that the second data item S2 loaded on each of the devices in the plurality may be different and be based in part on the device ID associated with each particular device. In another scenario, the second data item S2 loaded onto a plurality of devices may be the same, having been generated based upon a group ID associated with the plurality of devices, rather than individual device ID's of each device.

It will be appreciated that transmission of the second data item S2 on an unprotected communication link is generally acceptable as the second data item S2 reveals no information about the mission key Mk if the first encryption key KLot and the first data item S1 are unknown. It will further be appreciated that provisioning of a mission key to the device 110 does not place significant technical requirements on the device, which may be one, for example, that has non-volatile memory with the first data item S1 stored therein and processing capabilities for performing an exclusive-or operation. A communication link and device ID are generally present in the devices of interest.

Figure 2:
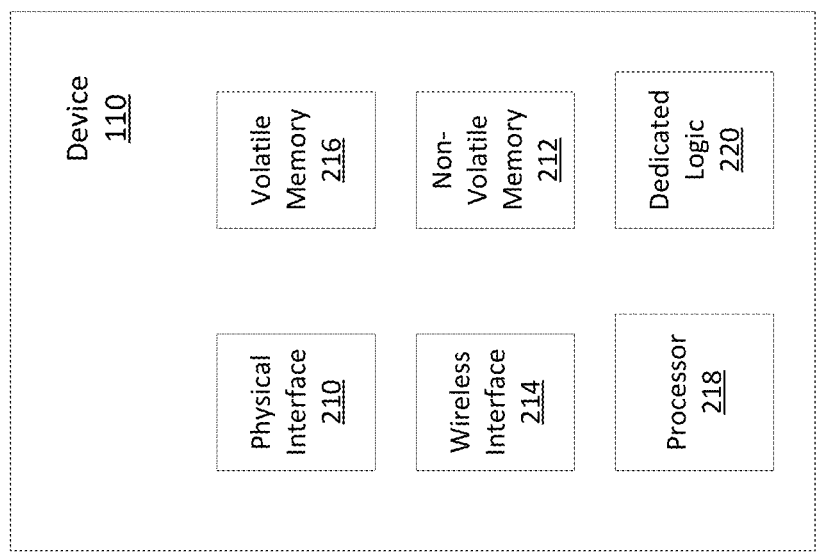
FIG. 2 is a diagram depicting example functional components for an example device.

The device 110 may be any that is suitable for a desired application. For example, the device 110 may be a sensor device, a robotic device, a computing device, a switch device, a lighting instrument, or any other type of device for which there is a need or desire to provision a cryptographic key. FIG. 2 depicts functional components of an example device 110. As shown, an example device 110 may comprise a physical interface 210 which may be any that is suitable for physically interfacing with another device for receiving and sending data. For example, the physical interface 210 may be suitable for interfacing with a system such as the secure computing system 132 for receiving a first data item S1. The device 110 may comprise a non-volatile memory 212 which may be any non-volatile memory suitable for storing data on a permanent basis. For example, a non-volatile memory 212 may be suitable for storing a first data item S1. The device 110 may also comprise a wireless interface 214 which may be any suitable for providing wireless communication with the device 110. For example, the wireless interface 214 may be a radio frequency interface suitable for communicating with a key split generator system 142 to receive second data item S2. The device 110 may further comprise a processor 218 and dedicated logic 220, which may be software or hardware-based logic, for performing the various operations associated with device 110 including, for example, the ability to generate a second encryption key or mission key Km from a first data item S1 and a second data item S2. A volatile memory 216 may be any suitable for storing data in a non-persistent manner. The volatile memory 216 may be used, for example, to store a mission key Km therein upon generation by the device 110.

Figure 3:
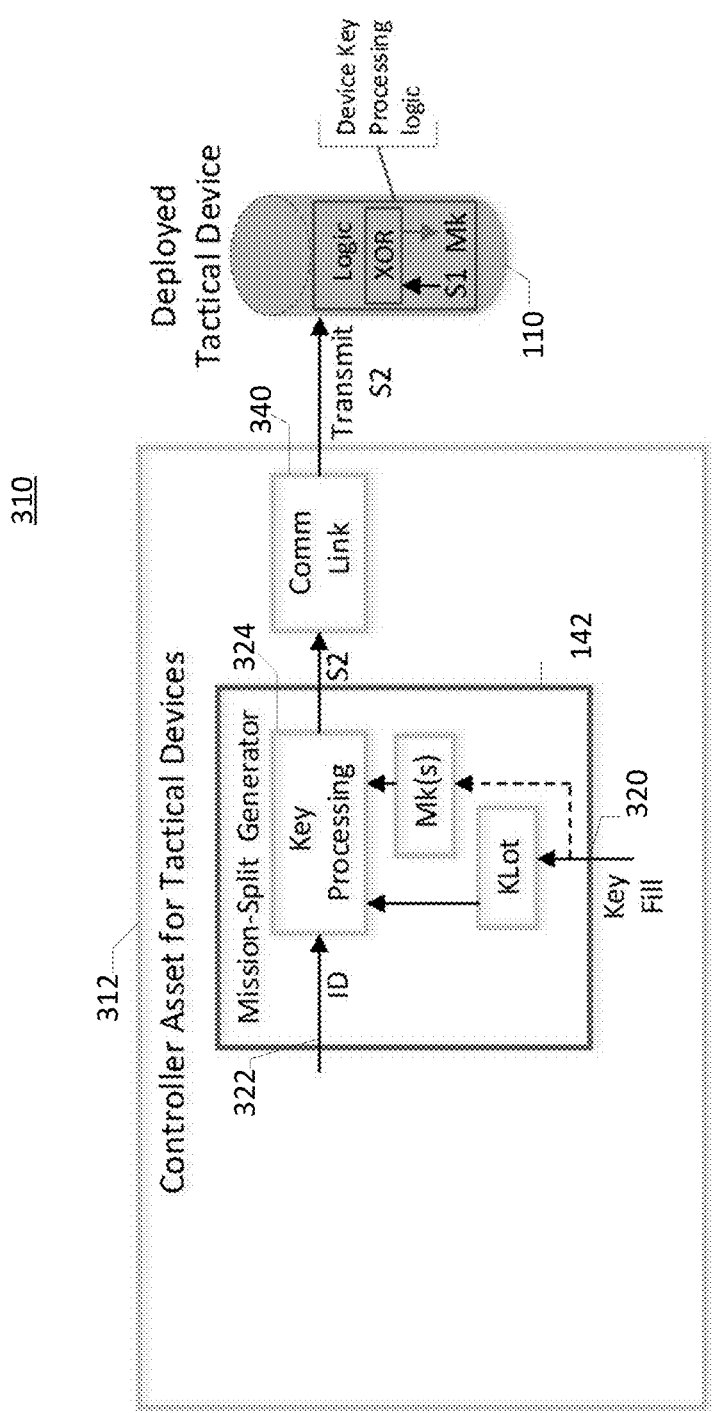
FIG. 3 is a diagram depicting an example system adapted to interface with an example device.

FIG. 3 depicts an example system 310 adapted to provision a mission key to an example device 110. In the illustrated example, processing components are comprised in a controller asset system 312. The controller asset system 312 may operate in any suitable environment depending upon the intended device deployment. For example, in the scenario the controller asset system 312 may be used to deploy tactical devices 110 such as sonobuoys into the operational field, controller asset system 312 may be a system operating on an airplane from which the devices/sonobuoys 110 are deployed.

The controller asset system 312 comprises a mission split generator 142. The mission split generator 142 may comprise a device identifier port 322 adapted to receive device ID's for devices 110. The device identifier port 322 may be adapted to receive device ID's for devices 110 using any suitable interface. For example, device identifier port 322 may comprise: a type pad interface adapted to receive device ID's; a communications port (e.g., USB port) adapted to receive one or more files containing data specifying one or more device ID's; a bar-code reader adapted to read device ID's printed on devices; and/or any other suitable interface for receiving Device ID's. In an example wherein the device 110 is a tactical device with the device's ESN serving as the device ID, the ESN may be retrieved from the device 110 using a broadcast communication protocol. In an example, a single device ID may be entered that applies to a plurality of devices 110. For example, a single device ID may apply to all devices that are part of the same group or lot of devices. The devices in the group may be those that are being put into operation as part of the same deployment.

The mission split generator 142 has stored thereon an admin key, KLot, and at least one encryption or cryptographic key, mission key Mk. The mission key Mk may have been received into the mission split generator 142 via a key fill port 320 from, for example, a Key Management Infrastructure (KMI), or may have been generated by the mission split generator 142 using, for example, a random number generator. The mission key generator 142 further comprises a key processing functionality 324 which is adapted to generate a second data item S2 for each of the devices 110. More particularly, the key processing functionality 324 may generate the first data item S1 corresponding to a particular device 110 by performing a hash of a concatenation of the device ID of the particular device 110 and the admin key, KLot. The key processing functionality 324 performs a splitting operation such as, for example, an exclusive-or operation, between the first data item S1 and the encryption key, Km, to generate the second data item S2.

The controller asset system 312 communicates the generated second data item S2 over a communication link 340 to the deployed device 110. The communication link 340 may be any that is suitable to communicate data between the system 312 and the device 110. The communication link 340 may be duplex, or alternatively may comprise two links, one for carrying data in each direction. In an example scenario, the communication link 340 may employ a wireless interface such as a radio frequency interface.

The deployed device 110 applies logic therein to the received second data item S2 and the previously received first data item S1 to generate the mission key Mk. The device 110 may thereafter use the mission key Mk to encrypt data prior to communication to the mission split generator 142 or other suitable system comprising mission key Mk. To the extent another system may communicate with device 110 using encryption, such system may be provisioned with the mission key Mk so as to be able to encrypt and decrypt data sent and received from device 110. A system that communicates with the provisioned device 110 may have a fill port over which it may receive the same keys as may have been placed on the mission split generator 142.

It will be appreciated that while the processing described herein describes creating a single mission key per device. Any number of keys may be provisioned using the same processing as described herein. Accordingly, if two keys are required to secure both directions of a communications link, either two keys may be formed in one transaction, or two transactions may be executed.

Figure 4:
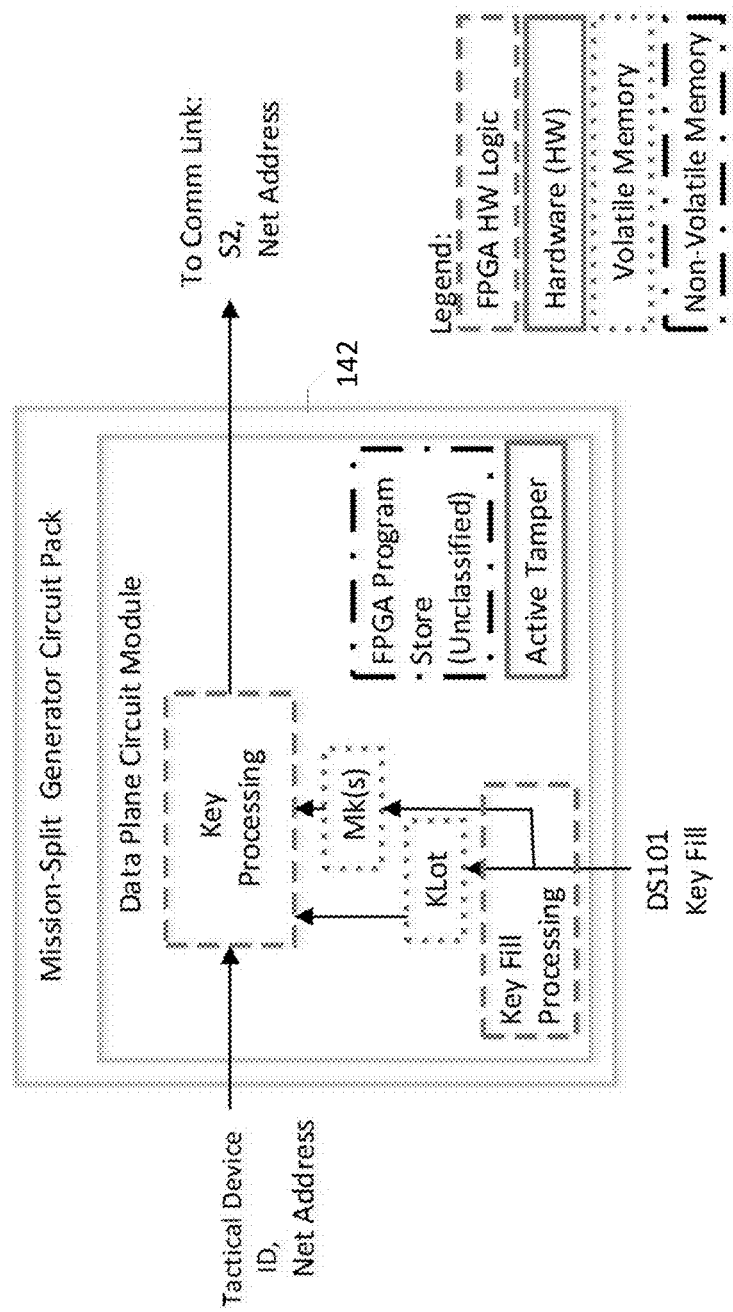
FIG. 4 is a diagram depicting an example system adapted to interface with an example device.

FIG. 4 depicts an isolated view of the mission split generator 142. A generic control plane (not shown) may be used to initialize and control the mission split generator 142. A data plane module 410 is adapted to provide the functionality as described herein. In an example embodiment wherein device 110 is applied to tactical or military activities, and given the sensitive nature of key processing, the functions provided by the mission split generator 142 may be implemented in various types of hardware. Hardware may be easily verified and validated to provide the necessary levels of high assurance and fail-safe operation. As illustrated in FIG. 4, most processing functions are performed in FPGA logic, with the exception of some specialize circuits that must be more custom, such as, for example, an active tamper detection function to protect key material from compromise. FPGA configuration data may be unclassified and stored in non-volatile memory. Key material is generally classified and must be stored in volatile memory when it is in usable, unencrypted form. Encrypted key material may be stored in non-volatile memory if encrypted although this optional feature is not shown. A standard DS 101 key fill interface may be implemented in FPGA logic and may be capable of accepting either classified (red) or unclassified (black) key material.

It should be appreciated that while not illustrated, mission slit generator 142 may co-reside in a circuit pack module providing other services required on the controlling asset. For example, such controlling assets often require link encryption devices for communications links. The security requirements on the mission split generator 142 and the link encryption devices are typically similar and the additional component cost to add the processing as described herein to other components is small. In a scenario wherein the mission split generator 142 and a communication link encryption device are co-resident in the same circuit pack, mission keys created by a randomizer may provide advantages over mission keys supplied from a fill device. For example, the mission keys supplied by a randomizer eliminate the manual key fill process while providing greater security as the key exists in fewer places and for a shorter duration.

The mission split generator 142 may be packaged in a standard commercial of the shelf (COTS) form factor. For example, mission split generator 142 may have an industry standard VITA 46 3U VPX form factor. In an example scenario, mission split generator 142 may be fully closed and conduction cooled in order to provide greater security.

Figure 5:
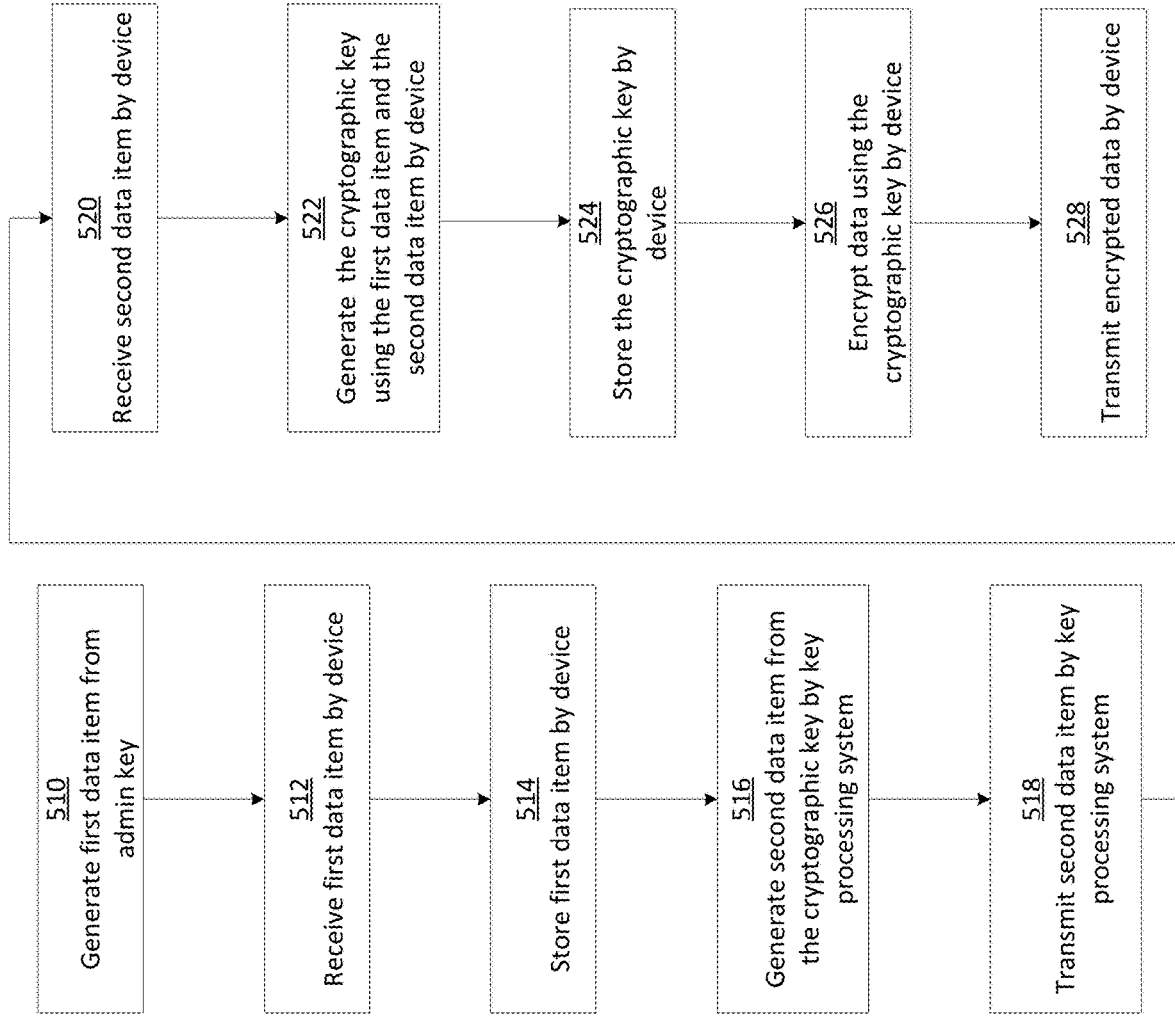
FIG. 5 is a diagram depicting example processing for provisioning a cryptographic key.

FIG. 5 depicts an example process for provisioning a cryptographic key to a device. As shown, at block 510, a first system, which may be a secure provisioning system 132 may be used to generate and load a first data item S1, which may be referred to as a first split, onto a particular device 110. The secure provisioning system 132 may generate the first data item S1. For example, the secure provisioning system 132 may generate the first data item S1 using a random number generator. In another example, the secure provisioning system 132 may generate the first data item S1 from an admin key by performing a function such as, for example, a cryptographic hash function, on a concatenation of the admin key and a device ID associated with the device 110. In an example, the admin may be a group key, KLot, that may be associated with, for example, the device 110 or a group of devices. KLot may be, for example, a master key used for each device in a manufacturing lot or otherwise chosen group of devices. In an example scenario, the first data item S1 may be generated by performing a secure hash algorithm function on the concatenation of KLot with the device ID. The processing may be expressed as S1=SHA (KLot||ID), where || refers to the concatenation function, and SHA refers to a secure hash algorithm which may be any irreversible function evaluated for security purposes. While the first data item S1 may be generated by performing a secure hash on a concatenation, other suitable processing may be used to generate a first data item, provided the same processing is used during generation of the second data item S2 as described below.

At block 512, the device 110 receives the first data item S1 from secure provisioning system 132. In an example scenario, the secure provisioning system 132 may physically interface with the device 110 to load the first data item S1.

At block 514, the device 110 stores the first data item S1 in memory. For example, the device 110 may store the first data item in non-volatile memory.

At block 516, a second computing system, which may be the mission split generator 142, generates the second data item S2, which also may be referred to as a split. The mission split generator 142 may use the device ID for device 110 to identify the corresponding admin key, KLot, and thereby determine the first data item S1. In one example scenario, the mission split generator 142 may generate the first data item S1 in the same manner as described above using KLot and the device ID and as represented by the expression S1=SHA (KLot||ID). In another example scenario, the mission split generator 142 may use the device ID of device 110 to query a database for the first data item S1 associated with the device 110.

The mission split generator 142 uses a cryptographic key, which may be the mission key Km, and the first data item S1 to generate a second data item S2. In an example scenario, the mission split generator 142 may perform a splitting operation on the mission key Km using the first data item S1, i.e., first split, to generate the second data item or split S2. In an example, performing the splitting operation may comprise performing an exclusive-or operation on the first data item S1 and the mission key Km in order to generate the second data item S2. The generation of the second data item S2, i.e., the second split, may be represented by the expression S2=[SHA (KLot||ID)] $\otimes$ Km, where $\otimes$ refers to the binary exclusive-or operation. It will be appreciated that the mission key Km may be generated in any suitable manner. For example, the mission key may be received or loaded from an external system. In another example, the mission key Km may be generated using a random number generator.

At block 518, the mission key generator 142 communicates the generated second data item S2 to the device 110. The mission key generator 142 may communicate the S2 over any suitable interface, including any suitable wireless interface.

At block 520, the second data item S2 is received at the device 110.

At block 522, the device 110 uses the received second data item S2 and the previously received first data item S1 to generate the cryptographic key, mission key Km. In an example wherein the second data item S2 was generated by mission generator 142 using a splitting operation, the device 110 may generate Km by performing a combining operation on the first data item S1 and the second data item S2. The combining operation combines S1 and S2 to form a new value. In an example scenario, the combining operation may be the same operation as the splitting operation that was used to generate the split S2. In an example scenario wherein the second data item S2 was generated by the mission key generator 142 using an exclusive-or operation, i.e., the splitting operation, on the first data item S1 and the cryptographic key Km, the device 110 generates Km by performing an exclusive-or operation, i.e., a combining operation, on the first data item S1 and the second data item S2.

At block 524, the device 110 stores the generated mission key Km in volatile memory.

At block 526, the device 110 may use the mission key Km to encrypt data and, at block 528, may communicate the encrypted data to the mission key generator 142 or other designated device. The device 110 may be adapted to receive data that was encrypted using the mission key Km and to decrypt the encrypted data using the mission key.

Figure 6:
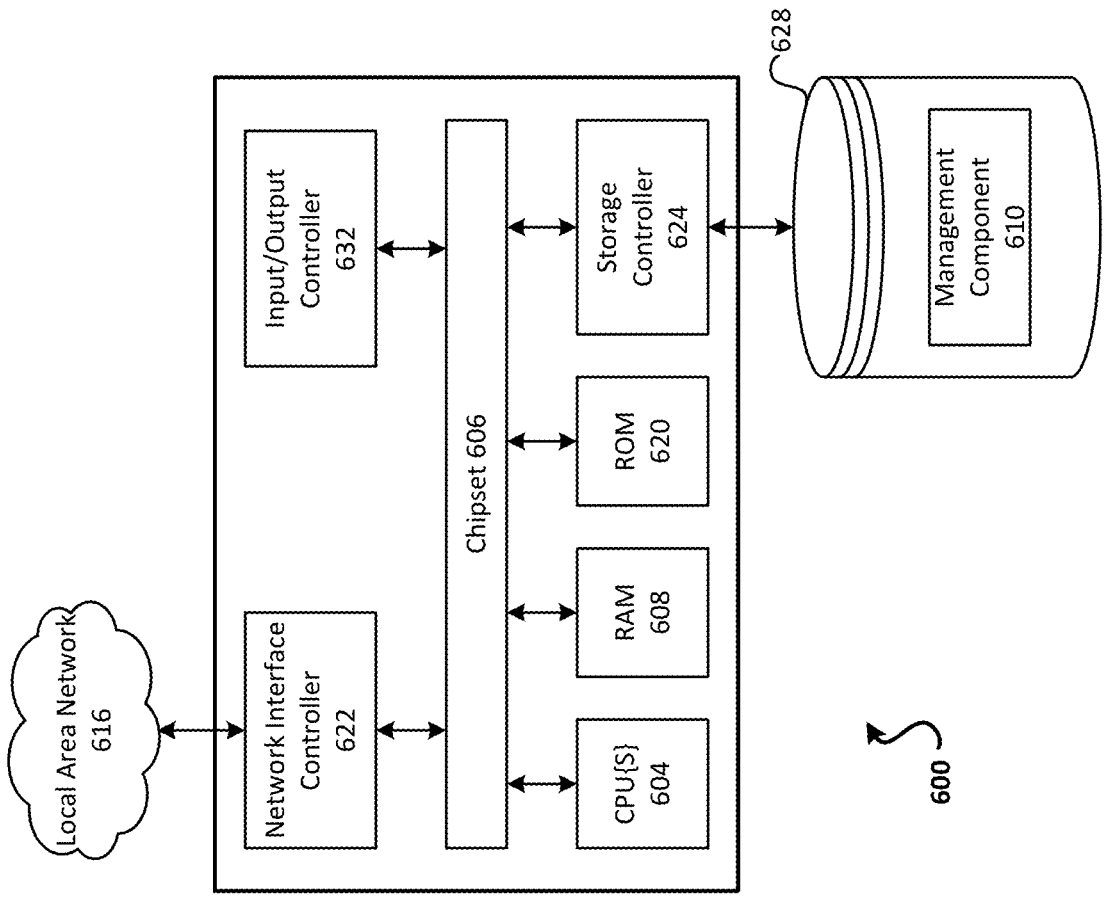
FIG. 6 is a diagram depicting example components of an example processing system.

While example processing for provisioning encryption keys has been described with reference to tactical devices and military deployments, it will be appreciated that the disclosed processing may be applied to any suitable device and environment. For example, private and commercial devices may make use of key provisioning as described herein. Deployment of Internet of Things (IoT) devices may employ key provisioning processing as described herein. Indeed, any devices, which may include, for example, devices that are relatively inexpensive devices without user interfaces, that may be stored for indefinite periods prior to use, and/or that may be deployed in large numbers, may benefit from key processing as described herein. FIG. 6 depicts an example computing architecture for a computing system 600 capable of executing software for performing operations such as described herein in connection with FIGS. 1-5. The computer architecture of FIG. 6 illustrates a computing system which may be utilized to execute aspects of the functionality presented herein described as executing on systems 132, 142, or 312, or other computing systems. It will be appreciated that some or all of the components described in connection with computing system 600 may not be consistent with the functionality or operating conditions of systems 132, 142, and 312, and therefore may not be employed in such systems.

The system 600 may include a baseboard, or "motherboard," which is a printed circuit board to which a multitude of components or devices may be connected by way of a system bus or other electrical communication paths. One or more central processing units (CPUs) 604 may operate in conjunction with a chipset 606. The CPUs 604 may be standard programmable processors that perform arithmetic and logical operations necessary for the operation of the computer 600.

The CPUs 604 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The chipset 606 may provide an interface between the CPUs 604 and the remainder of the components and devices on the baseboard. The chipset 606 may provide an interface to a random-access memory (RAM) 608 used as the main memory in the computer 600. The chipset 606 may further provide an interface to a computer-readable storage medium, such as a read-only memory (ROM) 620 or non-volatile RAM (NVRAM) (not shown), for storing basic routines that may help to start up computer 600 and to transfer information between the various components and devices. ROM 620 or NVRAM may also store other software components necessary for the operation of the computer 600 in accordance with the embodiments described herein.

The computer 600 may operate in a networked environment using logical connections to remote computing nodes and computer systems through network 616 which may be any suitable or other interface such as a wireless radio frequency interface. The chipset 606 may include functionality for providing network connectivity through a network interface controller (NIC) 622. The NIC 522 may be capable of connecting the computer 600 to other computing nodes over the network 616. It should be appreciated that multiple NICs 622 may be present in the computer 600, connecting the computer to other types of networks and remote computer systems.

The computer 600 may be connected to a mass storage device 628 that provides non-volatile storage for the computer. The mass storage device 628 may store system programs, application programs, other program modules, and data, which have been described in greater detail herein. The mass storage device 628 may be connected to the computer 600 through a storage controller 624 connected to the chipset 606. The mass storage device 628 may consist of one or more physical storage units. The storage controller 624 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computer 600 may store data on mass storage device 628 by transforming the physical state of the physical storage units to reflect the information being stored. The specific transformation of a physical state may depend on various factors and on different implementations of this description. Examples of such factors may include, but are not limited to, the technology used to implement the physical storage units and whether mass storage device 628 is characterized as primary or secondary storage and the like.

For example, the computer 600 may store information to the mass storage device 628 by issuing instructions through the storage controller 624 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 600 may further read information from mass storage device 628 by detecting the physical states or characteristics of one or more particular locations within the physical storage units.

In addition to the mass storage device 628 described above, the computer 600 may have access to other computer-readable storage media to store and retrieve information, such as program modules, data structures, or other data. It should be appreciated by those skilled in the art that computer-readable storage media can be any available media that provides for the storage of non-transitory data and that may be accessed by the computer 600.

By way of example and not limitation, computer-readable storage media may include volatile and non-volatile, transitory computer-readable storage media and non-transitory computer-readable storage media, removable and non-removable media implemented in any method or technology. Computer-readable storage media includes, but is not limited to, RAM, ROM, erasable programmable ROM (EPROM), electrically erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage, other magnetic storage devices, or any other medium that can be used to store the desired information in a non-transitory fashion.

The mass storage device 628 may store an operating system utilized to control the operation of the computer 600. According to one embodiment, the operating system comprises a version of the LINUX operating system. According to another embodiment, the operating system comprises a version of the WINDOWS SERVER operating system from the MICROSOFT Corporation. According to further embodiments, the operating system may comprise a version of the UNIX operating system. It should be appreciated that other operating systems may also be utilized. The mass storage device 628 may store other system or application programs and data utilized by the computer 600, such as a management component 610 and/or the other software components described above.

The mass storage device 628 or other computer-readable storage media may also be encoded with computer-executable instructions, which, when loaded into computer 600, transforms the computer from a general-purpose computing system into a special-purpose computer capable of implementing the embodiments described herein. These computer-executable instructions transform the computer 600 by specifying how the CPUs 604 transition between states, as described above. The computer 600 may have access to computer-readable storage media storing computer-executable instructions, which, when executed by the computer 600, may perform operating procedures described above.

The computer 600 may also include an input/output controller 632 for receiving and processing input from a number of input devices, such as a keyboard, a mouse, a touchpad, a touch screen, an electronic stylus, or other type of input device. Similarly, the input/output controller 632 may provide output to a display, such as a computer monitor, a flat-panel display, a digital projector, a printer, a plotter, or other type of output device. It will be appreciated that the computer 600 may not include all of the components shown in FIG. 6, may include other components that are not explicitly shown in FIG. 6, or may utilize an architecture completely different than that shown in FIG. 6.

Accordingly, Applicant discloses improved systems and methods for cryptographic key provisioning and management. In an example embodiment, a device may be loaded with a first data item. The device may store the first data item in non-volatile memory. The device may subsequently receive a second data item, where the second data item was previously generated from the first data item and a cryptographic key. The device may then perform a function such as, for example, an exclusive-or on the first data item and the second data item to generate the cryptographic key. The device may thereafter use the generated cryptographic key to encrypt data which may be transmitted over a wireless interface.

It will be appreciated that systems and methods described herein may offer various results. For example, the processing for provisioning a cryptographic key may be relatively simple and low cost relative other methodologies. Existing key split techniques may require the final mission key or key encryption key to be present in the device (protected by the split) prior to deployment. Using processing described herein, mission keys may be formed in the tactical device and controlling asset after deployment and without coordinating a pre-shared mission key.

Using processing described herein, the mission key Mk may be chosen independently of any data preconfigured on the device, which eliminates key management operations that would otherwise have had been needed to coordinate systems.

The processing described herein may involve an exclusive-or operation being performed in the tactical device, which is simpler than the OTA rekey approaches such as MIT/LL TDKM that may otherwise be used. The described processing may remove the need for a device to have a fill port, thereby reducing the complexity and expense of the device. The described processing may also free the device of storage time limits, enabling, for example, five year or greater storage times where the mission key, KEK, or private key may have a limited lifetime such as 3 or fewer years. The described processing may also free the device of some storage power requirements. This characteristic may be useful, for example, in a deployment of sonobuoys which commonly operate using salt water batteries that are activated after deployment.

Using processing described herein, a device may generate its mission key after the tactical device is deployed with no key material being present prior to deployment. This simplifies the tamper protection requirements on the stored device. For example, OTA rekey mechanisms typically have active tamper requirements which requires the device to have power while in storage. The described processing may eliminate this need.

The described processing may have natural quantum resilience due to the nature of split key math. This same level of resistance in typical OTA key schemes require additional complicated and classified algorithms that greatly complicate the storage, use, and disposal of the device.

It will be appreciated that while illustrative embodiments have been disclosed, the scope of potential embodiments is not limited to those explicitly set out. For example, while the system has been described with reference to securing communications with tactical devices such as sonobuoys, the disclosed systems and methods are applicable to any type of device which may require a cryptographic key. While examples are described in connection with distributing symmetric keys, the disclosed methods and systems may likewise be applied to distributing other key types including, for example, asymmetric private keys. Likewise, while the processing steps are described as being performed at a particular time, such as at or near manufacture, the processing steps may be performed at other suitable times consistent with the overall process. The description is provided by way of illustration and not for purposes of limiting the potential embodiments. Moreover, while in an example, a splitting operation is described as being an exclusive-or operation, other splitting operations may be employed. Likewise, while an example combining operation is described as being an exclusive-or operation, other splitting operations may be employed.

It is understood that in some instances the entities performing the processes described herein may be logical entities that may be implemented in the form of software (i.e., computer-executable instructions) stored in a memory of, and executing on a processor of, a mobile device, network node or computer system. That is, the method(s) may be implemented in the form of software (i.e., computer-executable instructions) stored in a memory of a mobile device and/or network node, such as the node or computer system, which computer executable instructions, when executed by a processor of the node, perform the processes discussed. It is also understood that any transmitting and receiving processes illustrated in FIGs may be performed by communication circuitry of the node under control of the processor of the node and the computer-executable instructions (e.g., software) that it executes.

The various techniques described herein may be implemented in connection with hardware or software or, where appropriate, with a combination of both. Thus, the methods and apparatus of the subject matter described herein, or certain aspects or portions thereof, may take the form of program code (i.e., instructions) embodied in tangible media, such as hard drives, or any other machine-readable storage medium wherein, when the program code is loaded into and executed by a machine, such as a computer, the machine becomes an apparatus for practicing the subject matter described herein. In the case where program code is stored on media, it may be the case that the program code in question is stored on one or more media that collectively perform the actions in question, which is to say that the one or more media taken together contain code to perform the actions, but that—in the case where there is more than one single medium—there is no requirement that any particular part of the code be stored on any particular medium. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the subject matter described herein, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although example embodiments may refer to utilizing aspects of the subject matter described herein in the context of one or more stand-alone computer systems, the subject matter described herein is not so limited, but rather may be implemented in connection with any computing environment, such as a network or distributed computing environment. Still further, aspects of the subject matter described herein may be implemented in or across a plurality of processing chips or devices, and storage may similarly be affected across a plurality of devices. Such devices might include personal computers, network servers, handheld devices, supercomputers, or computers integrated into other systems such as automobiles and airplanes.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

What is claimed:

1. A device, the device comprising:
   a nonvolatile memory;
   a volatile memory; and
   a processor, the processor configured to:
      receive a first external data item from a first external device, wherein the first external data item is a product of a hash function performed on a concatenation of a group key and an identifier;
      store the first external data item in the nonvolatile memory;
      receive a second external data item from a second external device, wherein the second external data item is a product of a splitting operation performed on a cryptographic key using the first external data item;
      generate the cryptographic key within the device by performing a combining operation on the first external data item from the first external device and the second external data item from the second external device; and
      store the cryptographic key in volatile memory.

2. The device of claim 1, wherein the identifier is associated with the device.

3. The device of claim 1, wherein the identifier is associated with a group of devices.

4. The device of claim 3, wherein the group key is associated with the device.

5. The device of claim 1, wherein the hash function is an irreversible function.

6. The device of claim 5, wherein the first external data item is a random number.

7. The device of claim 5, wherein the splitting operation comprises an exclusive-or operation on the first external data item and the cryptographic key.

8. The device of claim 1, wherein the processor is configured to generate the cryptographic key within the device by performing the combining operation on the first external data item and the second external data item by performing an exclusive-or operation on the first external data item and the second external data item.

9. The device of claim 5, wherein the device is a sonobuoy.

10. A device, the device comprising:
    a processor, the processor configured to:
       receive a first external data item from a first external device, wherein the first external data item is a product of a hash function performed on a concatenation of a group key and an identifier;
       receive a second external data item from a second external device; and
       generate a cryptographic key within the device using the first external data item from the first external device and the second external data item from the second external device, the cryptographic key being generated by the device without being received by the device.

11. The device of claim 10, wherein the processor is further configured to generate the cryptographic key within the device using the first external data item from the first external device and the second external data item from the second external device by performing an exclusive-or operation on the first external data item and the external second data item.

12. A device, the device comprising:
    a processor, the processor configured to:
       determine a first external data item associated with an external device, wherein the first external data item is a product a hash function on a concatenation of a group key and an identifier;
       determine a cryptographic key;
       generate a second data item by performing a splitting operation on the cryptographic key using the first external data item associated with the external device; and
       send the second data item to the external device.

13. The device of claim 12, wherein the group key is associated with a plurality of external devices.

14. The device of claim 12, wherein the processor is further configured to determine the first external data item associated with the external device by retrieving the group key from a database.

15. The device of claim 12, wherein the identifier is associated with the external device.

16. The device of claim 12, wherein the cryptographic key is adapted for encrypting data for communication with the external device.

17. The device of claim 12, wherein the processor is further configured to generate the second data item by performing the splitting operation on the cryptographic key using the first external data item associated with the external device by performing an exclusive-or operation on the first external data item and the cryptographic key.

18. A method being performed by a device, the method comprising:
    determining, by the device, a first external data item associated with an external device, wherein the first external data item is a product of a hash function on a concatenation of a group key and an identifier;

determining, by the device, a cryptographic key;
generating, by the device, a second data item by performing an exclusive-or operation on the first external data item associated with the external device and the cryptographic key; and
sending, by the device, the second data item to the external device.

19. The method of claim 18, wherein the identifier is associated with the external device.

* * * * *